United States Patent
Nagaraja et al.

(10) Patent No.: US 10,750,466 B2
(45) Date of Patent: Aug. 18, 2020

(54) REFERENCE SIGNAL (RS) CONFIGURATION AND TRANSMISSION FROM SERVING AND NEIGHBOR CELL FOR MOBILITY

(71) Applicant: QUALCOMM Incorporated, San Diego, CA (US)

(72) Inventors: Sumeeth Nagaraja, San Diego, CA (US); Tao Luo, San Diego, CA (US); Muhammad Nazmul Islam, Edison, NJ (US); Juergen Cezanne, Ocean Township, NJ (US); Chinmay Vaze, San Diego, CA (US); Raghu Narayan Challa, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 16/005,739

(22) Filed: Jun. 12, 2018

(65) Prior Publication Data
US 2018/0368088 A1   Dec. 20, 2018

Related U.S. Application Data

(60) Provisional application No. 62/521,092, filed on Jun. 16, 2017.

(51) Int. Cl.
*H04W 56/00*      (2009.01)
*H04W 72/04*      (2009.01)
(Continued)

(52) U.S. Cl.
CPC ........... *H04W 56/005* (2013.01); *H04L 5/005* (2013.01); *H04L 5/0048* (2013.01);
(Continued)

(58) Field of Classification Search
CPC ........... H04W 56/001; H04W 56/0015; H04W 56/005; H04W 72/0406; H04W 72/0446;
(Continued)

(56) References Cited

U.S. PATENT DOCUMENTS

2015/0358848 A1* 12/2015 Kim ...................... H04W 24/10
                                                                        370/252
2016/0302098 A1    10/2016 Gheorghiu et al.
(Continued)

FOREIGN PATENT DOCUMENTS

WO    WO-2016204573 A1    12/2016
WO    WO-2017027066 A1     2/2017

OTHER PUBLICATIONS

International Search Report and Written Opinion—PCT/US2018/037194—ISA/EPO—dated Aug. 23, 2018.

*Primary Examiner* — Paul H Masur
(74) *Attorney, Agent, or Firm* — Patterson + Sheridan, L.L.P.

(57) ABSTRACT

According to certain aspects of the present disclosure, indicating which neighbor cells are synchronous or asynchronous with a serving cell may allow a UE to determine whether it can derive neighbor cell RS timing based on the serving cell timing.

34 Claims, 8 Drawing Sheets

(51) Int. Cl.
*H04L 5/00* (2006.01)
*H04W 4/70* (2018.01)

(52) U.S. Cl.
CPC ..... *H04W 56/001* (2013.01); *H04W 56/0015* (2013.01); *H04W 72/0406* (2013.01); *H04W 72/0446* (2013.01); *H04L 5/0073* (2013.01); *H04L 5/0091* (2013.01); *H04W 4/70* (2018.02)

(58) Field of Classification Search
CPC ....... H04L 5/001; H04L 5/0048; H04L 5/005; H04L 5/0073; H04L 5/0091
See application file for complete search history.

(56) References Cited

U.S. PATENT DOCUMENTS

| | | | |
|---|---|---|---|
| 2017/0359817 A1* | 12/2017 | Wittenmark | H04W 72/0426 |
| 2018/0110047 A1* | 4/2018 | Babaei | H04W 52/346 |
| 2018/0139586 A1* | 5/2018 | Park | H04L 5/0048 |
| 2018/0249463 A1* | 8/2018 | Huang | H04W 24/10 |

* cited by examiner

REFERENCE SIGNAL (RS) CONFIGURATION AND TRANSMISSION FROM SERVING AND NEIGHBOR CELL FOR MOBILITY

CLAIM OF PRIORITY UNDER 35 U.S.C. § 119

This application claims the benefit of U.S. Provisional Patent Application Ser. No. 62/521,092, filed Jun. 16, 2017, which is herein incorporated by reference in its entirety.

FIELD

The present disclosure relates generally to communication systems, and more particularly, to methods and apparatus for mobility measurement procedures according to new radio (NR) technologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a base station. The method generally includes determining, based on reported symbol timing differences between a serving cell and one or more neighbor cells, whether the neighbor cells are synchronous or asynchronous with the serving cell, providing an indication, to one or more user equipments (UEs), of which neighbor cells are synchronous or asynchronous with the serving cell, using the symbol timing differences to determine configurations for at least one of synchronization signals (SS) or channel state information reference signal (CSI-RS) transmissions in the neighbor cells, such that the CSI-RS or SS from the neighbor cells are transmitted within a measurement window, and providing an indication of the configurations to one or more UEs.

Certain aspects provide a method for wireless communication by user equipment (UE). The method generally includes receiving an indication of which neighbor cells are synchronous or asynchronous with a serving cell of the UE and, based on the indication, performing channel state information reference signal (CSI-RS) measurement in cells that are synchronous with the serving cell differently than in cells that are asynchronous with the serving cell.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
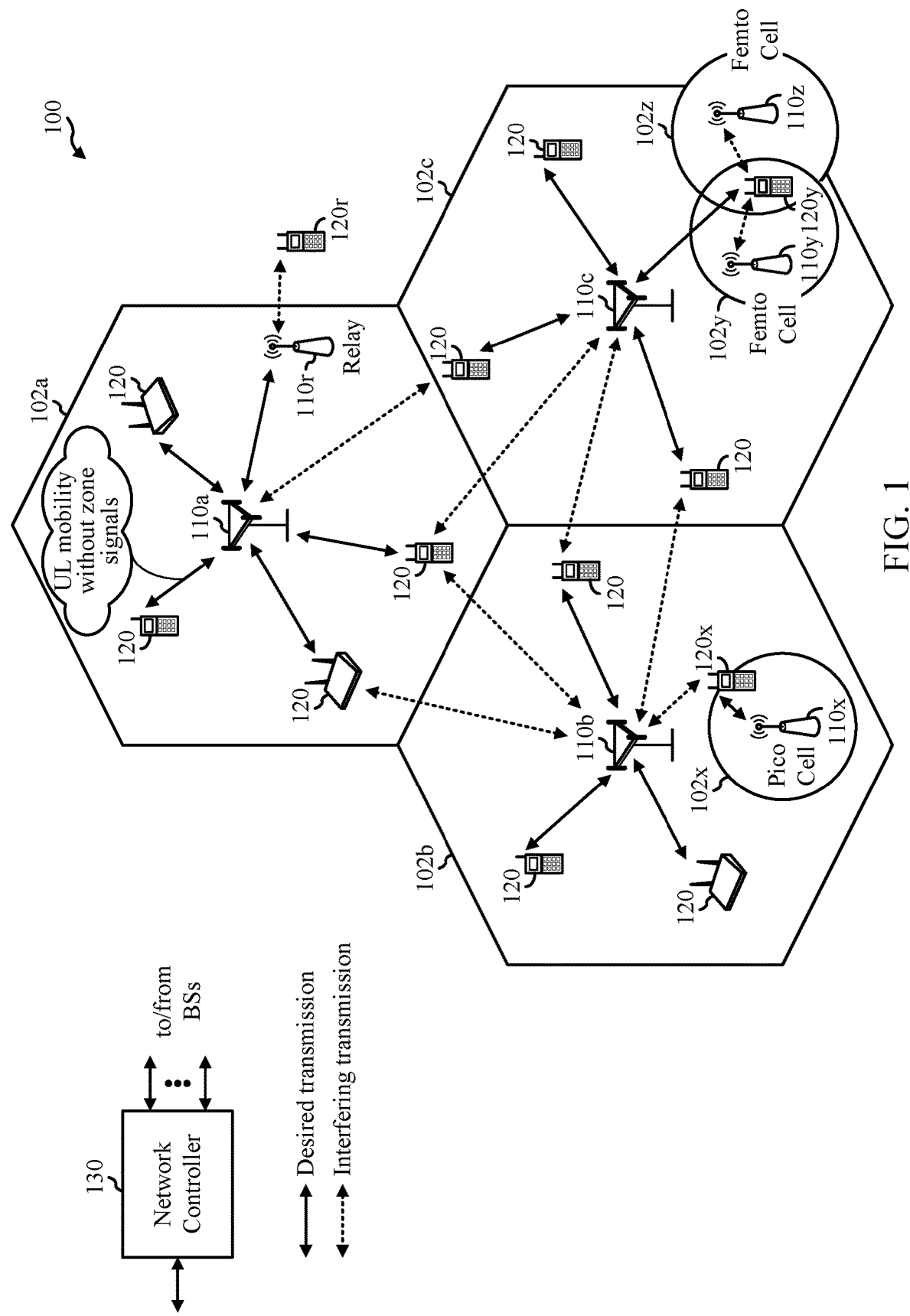
FIG. 1 is a block diagram conceptually illustrating an example telecommunications system, in which aspects of the present disclosure may be performed.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length (period) of 10 ms. Consequently, each subframe may have a length of 0.2 ms. In some cases, subframes may have a length (duration) of 1 ms and each subframe may be further divided into two slots of 0.5 ms each (e.g., with each slot containing 6 or 7 OFDM symbols depending on cyclic prefix (CP) length. A slot may be further divided into mini-slots, each mini-slot having a smaller duration (e.g., containing fewer symbols than a full slot). Each subframe may indicate a link direction (e.g., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
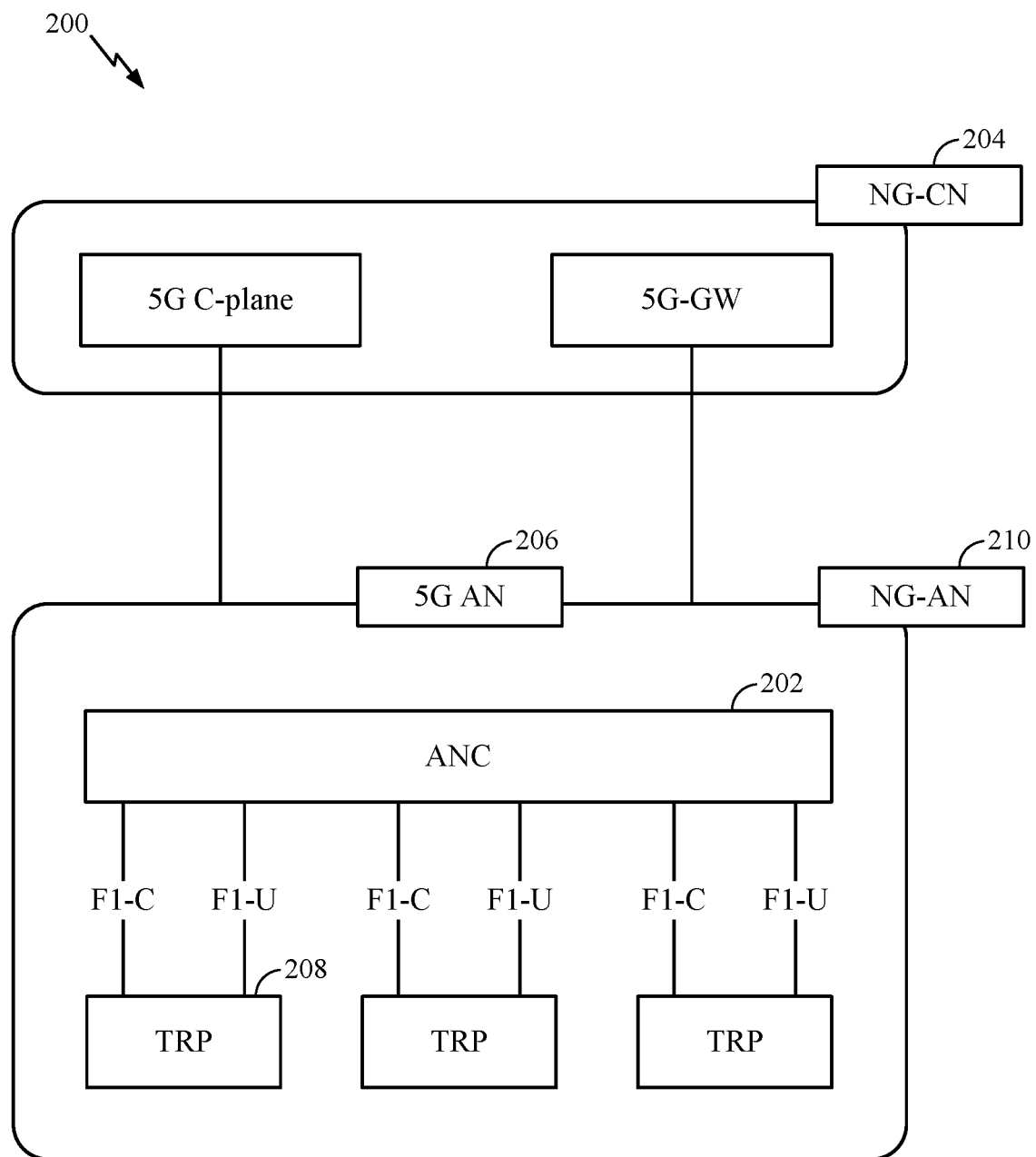
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
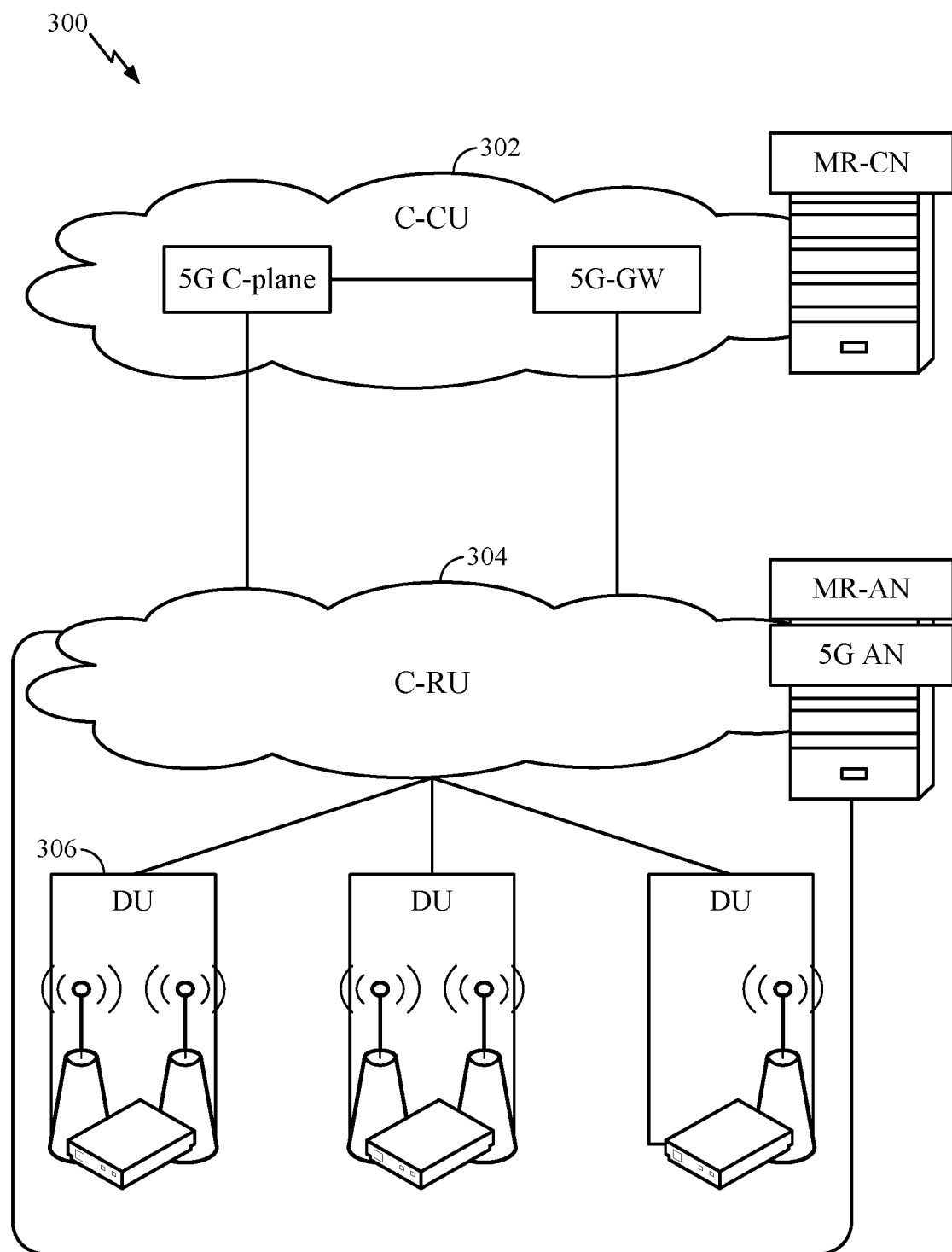
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
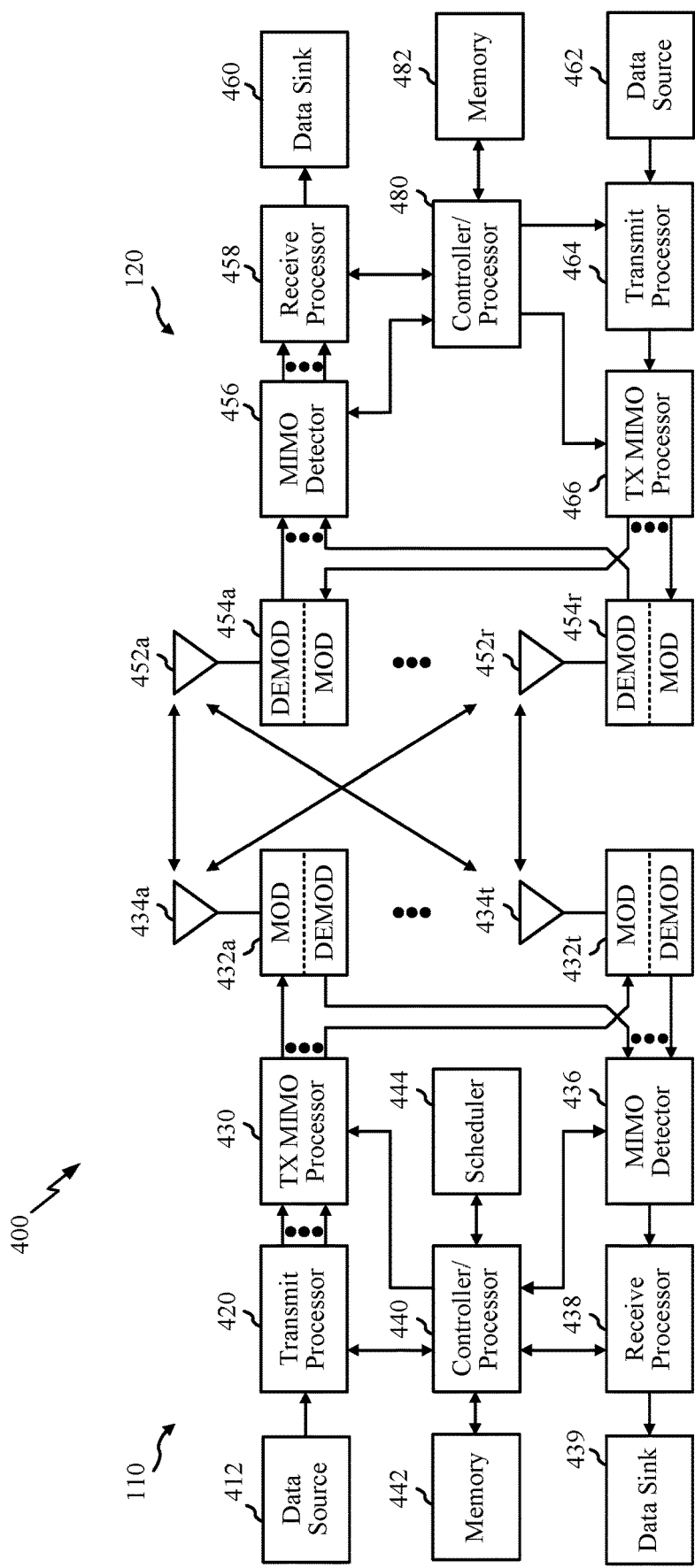
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, processors 466, 458, 464, and/or controller/processor 480 (used to implement transceiver or separate receiver and transmitter chain functions) of the UE 120 and/or antennas 434, processors 430, 420, 438, and/or controller/processor 440 of the BS 110 may be used to perform the operations described herein and illustrated with reference to FIGS. 10 and 11.

FIG. 4 shows a block diagram of a design of a BS 110 and a UE 120, which may be one of the BSs and one of the UEs in FIG. 1. For a restricted association scenario, the base station 110 may be the macro BS 110*c* in FIG. 1, and the UE 120 may be the UE 120*y*. The base station 110 may also be a base station of some other type. The base station 110 may be equipped with antennas 434*a* through 434*t*, and the UE 120 may be equipped with antennas 452*a* through 452*r*.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
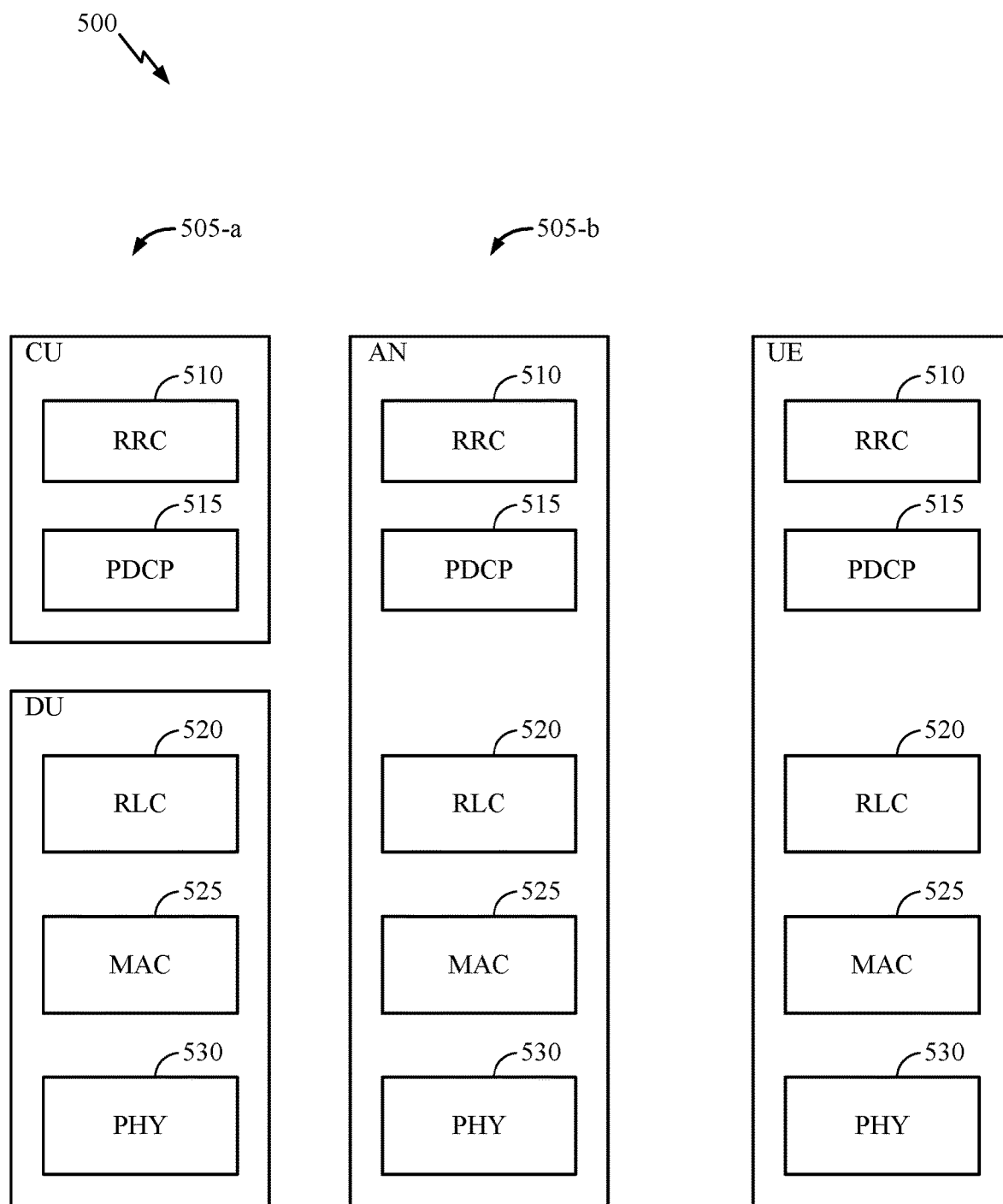
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
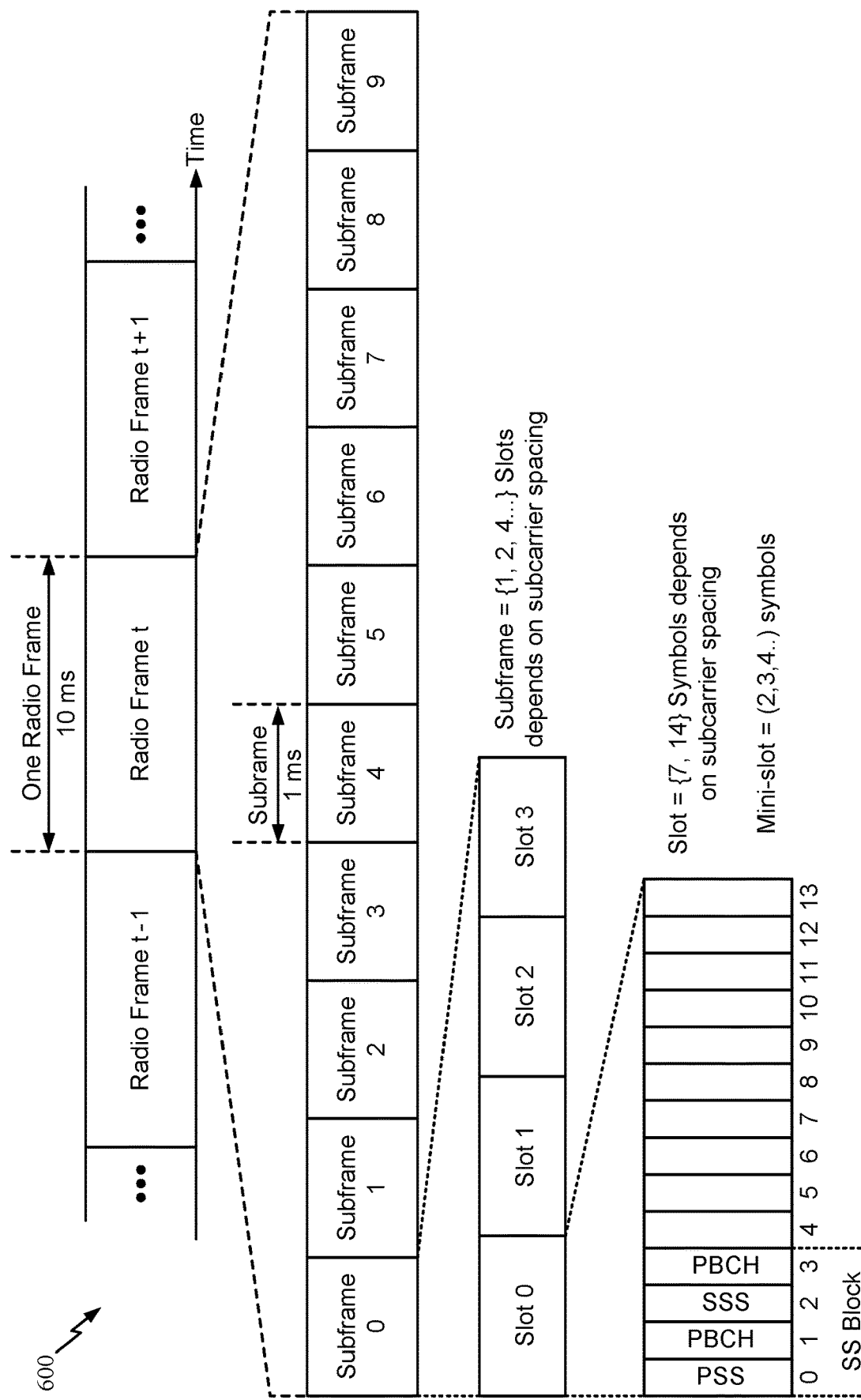
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example RS Configuration and Transmission from Serving and Neighbor Cell for Mobility In accordance with one or more aspects of embodiments disclosed herein, techniques for assisting in mobility measurement procedures based on reference signals (RS) are provided.

In some cases, such assistance may come in the form of a network entity (such as a base station of a serving cell) may notify a UE which neighboring cells are synchronous with the serving cell (and may provide separate CSI-RS configurations for synchronous and asynchronous cells). Further, the RS from synchronous cells can be aligned and transmitted during one measurement window while the asynchronous transmissions can be sent over a different measurement window. The UE RS measurement processing in different windows can be different. Thus, providing the UE with configuration information may result in more efficient processing (and reduced power consumption) at the UE. For example, the UE need not decode PBCH (to determine CSI-RS configuration) for at least synchronous cells. For asynchronous cells, the network can provide configuration, such that the UE can avoid decoding PBCH.

Various RS may be used for various purposes, such as making mobility decisions (e.g., when to switch from one cell to another). For example, for cell level mobility in RRC CONNECTED mode, CSI-RS can be used, in addition to IDLE mode RS (e.g., new radio synchronization signals or NR-SS used to allow for some mobility when in IDLE mode). The detection of neighbor cell for measurement is based on NR-SS (e.g., with PSS and SSS used for timing and to determine a cell ID).

For RRC_CONNECTED mode mobility involving NR-SS, a UE typically needs to know the NR-SS configuration for measuring NR-SS transmission from serving and neighbor cells. The NR-SS configuration typically includes at least: timing configuration including time offset and periodicity and configurable time/frequency/ports resources.

For RRC CONNECTED mode mobility involving CSI-RS, a UE needs CSI-RS configuration for measuring CSI-RS transmission from serving and neighbor cells. The CSI-RS configuration typically includes at least: NR Cell ID, timing configuration, including time offset and periodicity, number of antenna ports, configurable time/frequency resource to indicate RE mapping, configurable transmission/measurement bandwidth, parameters for sequence generation, configurable numerology, Spatial quasi co location (QCL) assumption (e.g., QCL between SS block and CSI-RS). As used herein, signals may be considered quasi co located if they are expected to encounter similar channel conditions.

An RS transmission (e.g., NR-SS/CSI-RS transmission) for Layer 3 (L3) mobility may aim to ensure that the UE throughput and battery life are not adversely impacted during measurements. To illustrate this, the following two options may be considered for CSI-RS transmission from serving and neighbor cells on a carrier frequency to occur at:

uncoordinated transmission or coordinated transmissions of CSI-RS. For uncoordinated transmission, the serving and neighbor cells transmit CSI-RS in different time periods (e.g., slots or mini-slots, referring to intervals that are a fraction of a subframe). For coordinated transmission, the serving and neighbor cells transmit CSI-RS in a coordinated effort to minimize UE wake-up for measurements (by allowing the UE to measure CSI-RS from both in a measurement window during a single wake-up period).

If CSI-RS transmission from serving and neighbor cell(s) are not coordinated among gNBs, the UE may need multiple measurement windows to measure RS from both serving and neighbor cell(s). Compounding the problem, the number of measurement windows may increase with the number of neighbors. This may adversely impact user rate due to scheduling limitation and may also impacts UE battery life as UE may have to wake-up multiple times to measure serving and neighbor cells(s).

On the other hand, if CSI-RS transmission from serving and neighbor cells occur in a coordinated way then there is the potential for the UE to measure CSI-RS from serving and neighbor cell(s) in one measurement window. Thus, the coordinated approach may limit the impact on UE throughput. Further, fewer wake-ups for measurements of serving and neighbor cells can improve UE battery life.

Aspects of the present disclosure may help further improve coordinated CSI-RS transmissions by providing information regarding whether neighbor cells are synchronous or asynchronous with a serving cell (e.g., an indication of which neighbor cells are synchronous and/or which are not). As will be described in greater detail below, this information may be used to help coordinate CSI-RS transmissions and, in some cases, may allow UEs to tailor CSI-RS measurements based on the information (e.g., avoiding the need to measure NR-SS and/or decode PBCH in synchronous cells before measuring CSI-RS).

The techniques provided herein may apply to intra-frequency measurements, as well as inter-frequency measurements (e.g., with switching between frequencies performed during a measurement gap).

Figure 7:
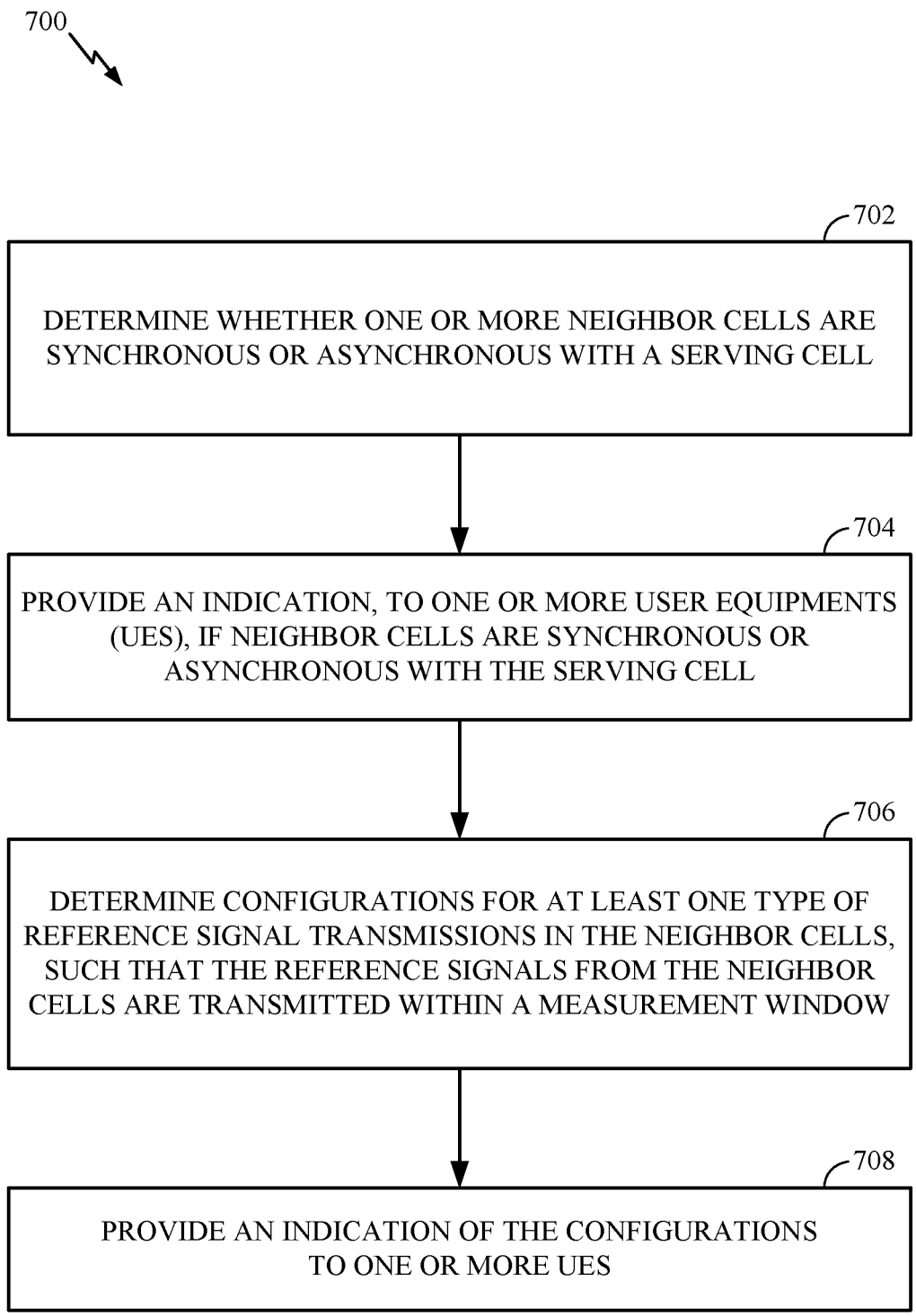
FIG. 7 illustrates example operations for wireless communications by a base station, in accordance with aspects of the present disclosure.

Turning now back to the figures, FIG. 7 illustrates operations 700 for wireless communications by a network entity (e.g., a source base station/gNB of a serving cell), in accordance with aspects of the present disclosure that may be implemented to address one or more of the above discussed situations and/or features.

Operations 700 begin, at 702, by determining, whether the neighbor cells are synchronous or asynchronous with the serving cell. In some cases, this determination may be made based on symbol timing differences between a serving cell and one or more neighbor cells (e.g., reported by one or more UE).

At 704, the network entity provides an indication, to one or more user equipments (UEs), if (and, in some cases, which) neighbor cells are synchronous or asynchronous with the serving cell. Indicating which neighbor cells are synchronous or asynchronous with the serving cell may allow a UE to determine whether it can derive neighbor cell RS timing (e.g., an index of an SS block) based on the serving cell timing.

At 706, the network entity determines (e.g., based on the symbol timing differences) configurations for at least one of synchronization signals (SS) or channel state information reference signal (CSI-RS) transmissions in the neighbor cells, such that the CSI-RS or SS from the neighbor cells are transmitted within a measurement window. At 708, the network entity provides an indication of the configurations to one or more UEs.

Figure 8:
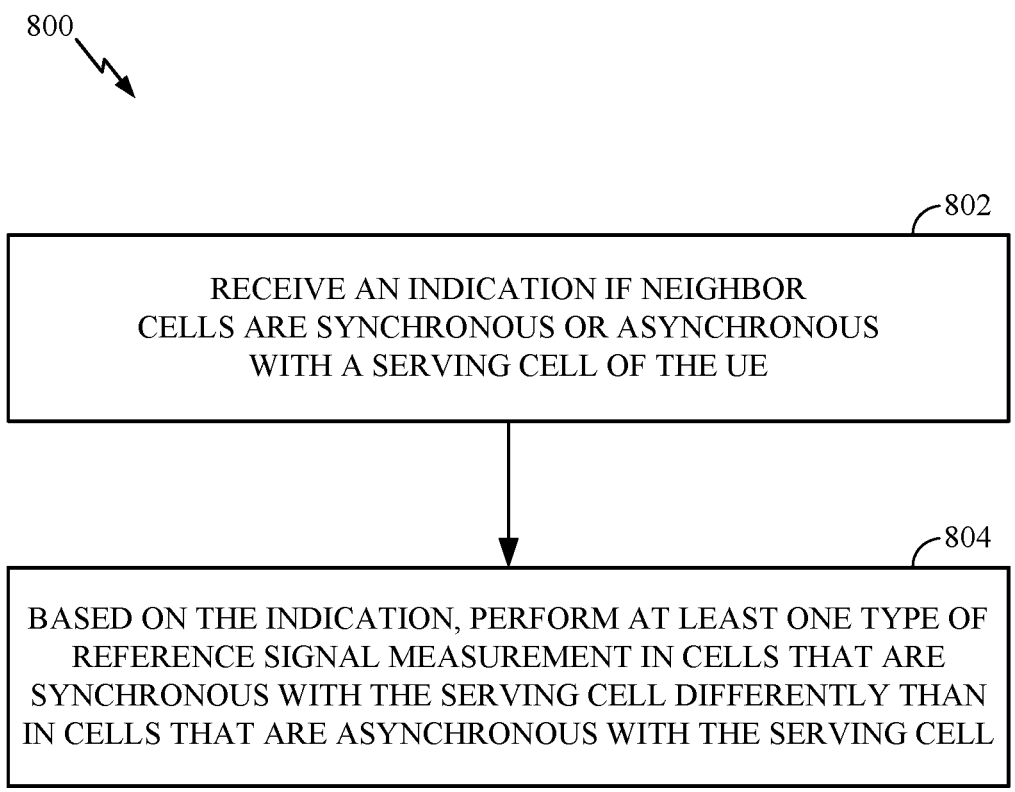
FIG. 8 illustrates example operations for wireless communications by a user equipment (UE), in accordance with aspects of the present disclosure.

FIG. 8 illustrates operations 800 for wireless communications by a user equipment (UE), in accordance with aspects of the present disclosure. For example, the UE may utilize information provided by a network in accordance with operations 800 of FIG. 8 described above.

Operations 800 begin, at 802, by receiving an indication if (and, in some cases, of which) neighbor cells are synchronous or asynchronous with a serving cell of the UE. At 804, based on the indication, the UE performs channel state information reference signal (CSI-RS) measurement in cells that are synchronous with the serving cell differently than in cells that are asynchronous with the serving cell.

On the network side, the network may determine if neighbor cells are synchronous/asynchronous and send an indication to the UE. As noted above, in some cases, the determination may be based on measurement reports received from UEs. For example, the network may configure one or more UEs to measure and report timing difference (e.g., symbol timing differences) between serving and one or more neighbor cell(s).

The network may, thus, obtain (derive) symbol timing difference from one or more UEs and, after obtaining the symbol timing difference, derive an estimate of symbol timing difference between the cell and neighbor(s). The network may then provide a list of CELL-IDs that are synchronous to a cell, for example, via broadcast (SI) or via a dedicated message to the UE. The network may also provide a list of CELL-IDs that are asynchronous to a cell, again, via broadcast (SI) or via a dedicated message to the UE.

In some cases, the network may use the symbol timing difference between serving and neighbor cell for the NR-SS, CSI-RS configuration and transmission coordination. To coordinate with neighbor cells, the network may provide CSI-RS configuration of one or more neighbor cells.

In some cases, the network may provide separate (different) configurations for SYNC cells (cells synchronous with the serving cell) and ASYNC cells (cells not synchronous with the serving cell). In some cases, a subset of parameters may be different for SYNC and ASYNC cells (and only that subset needs to be conveyed). For example, timing parameters, such as slot offsets or periodicities may be different for SYNC and ASYNC cells. For example, (a) slot offset(s) or periodicity may be same for all SYNC cells; and (b) different for ASYNC cells.

Further to this example, among SYNC cells, the symbol/slot offset of one or more cells may be provided such that the RS from one or more cells arrive (1) at the same slot/mini-slot or (2) one after the other (back-to-back). On the other hand, among ASYNC cells, the symbol/slot offset of one or more cells may be provided such that the RS from one or more cells arrive (1) at nearly the same slot/mini-slot or (2) one after the other (back-to-back).

A network may provide/coordinate CSI-RS configurations such that the CSI-RS of (serving and neighboring) cells arrive within a single measurement time-window (symbol/slots/mini-slots). In some cases, the slot offset for CSI-RS transmission may be a function of CELL-ID, NR-PSS or NR-SSS. To coordinate transmission of CSI-RS from neighbor cell(s), the network may notify the neighbor cell(s) to transmit CSI-RS (at coordinated times determined based on the serving or neighbor cell timing).

In this manner, the network may coordinate the transmission of RS (e.g., NR-SS or CSI-RS) from one or more cells in an effort for the RS from different cells to arrive within a measurement window. For example, the RS transmissions may be coordinated to arrive (1) at the same slot/mini-slot or (2) one after the other (back-to-back).

As noted above, from the UE-side perspective, the UE may receive information about which neighbor cells are synchronized (SYNC) or not synchronized (ASYNC) with the serving cell and perform CSI-measurement accordingly. In other words, the UE may perform CSI-measurement differently for SYNC cells than for ASYNC cells. As an example, a UE may be able to perform CSI-RS measurement in SYNC cells without having to monitor for NR-SS (e.g., to get cell timing). In other words, the UE may derive neighbor cell RS timing (e.g., an index of an SS block) for SYNC cells, based on the serving cell timing. On the other hand, for ASYNC cells, the UE may need to first detect NR-SS (e.g., to get cell timing and CSI-RS configuration) and, in some cases decode PBCH after detecting the NR-SS, before performing CSI-RS measurements. By only having to detect NR-SS when necessary, a UE may be able to reduce power (e.g., and stay in a low power state longer).

Using the techniques presented herein, for intra-frequency measurements, a UE may use the serving cell timing to derive the SSB index of neighbor cells in the same frequency layer. For inter-frequency measurements, a UE may use timing of any detected cell in the target frequency layer to derive the SSB index of neighbor cells of the target frequency layer. Cells in different frequency layers may not be assumed to be half radio frame aligned.

In some cases, a UE may determine whether to receive (monitor for) the CSI-RS with directional or omni-directional antenna configuration, based on CSI-RS configuration information. For example, a UE may wake up and, after waking, monitor for CSI-RS using an omni-directional setting if CSI-RS from multiple cells is configured to arrive at the same time (or within a tight timing window). On the other hand, the UE may monitor for CSI-RS using omni-directional or directional setting if CSI-RS is to arrive back to back (e.g., in subsequent symbols, slots, or mini-slots).

As described herein, assistance information (e.g., in the form of an indication of which neighboring cells are synchronous or asynchronous with a serving cell), a UE may be able to optimize its RS measurement processing. For example, a UE may be able to wake up and take measurements of RS in different cells in a single measurement window and determine whether or not to decode PBCH, which may lead to enhanced mobility decisions and reduced power consumption.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, operations 700 and 800 of FIGS. 7 and 8 may be performed by various processors shown in FIG. 4. Generally, where there are operations illustrated in figures, those operations may have corresponding counterpart means-plus-function.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). The phrase computer readable medium does not refer to a transitory propagating signal. In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a network entity, comprising:
   determining whether one or more neighbor cells are synchronous or asynchronous with a serving cell;
   providing an indication, to one or more user equipments (UEs), if one or more of the neighbor cells are synchronous or asynchronous with the serving cell;
   determining configurations for transmissions of at least one type of reference signal in the neighbor cells, such that the reference signals from the neighbor cells are transmitted within a measurement window, wherein the at least one type of reference signal comprises at least one of synchronization signal (SS) or channel state information reference signal (CSI-RS); and
   providing an indication of the configurations to one or more UEs, wherein at least one of the configurations for transmissions of the at least one SS or CSI-RS provided for neighbor cells synchronous with the serving cell are different than the configurations for transmissions of the at least one SS or CSI-RS provided for neighbor cells asynchronous with the serving cell.

2. The method of claim 1, where the network entity also provides an indication, to one or more UEs, of which neighbor cells are synchronous or asynchronous with the serving cell.

3. The method of claim 1, wherein:
   the determination of whether the one or more neighbor cells are synchronous or asynchronous with the serving cell is based on reported symbol timing differences between a serving cell and one or more neighbor cells; and
   the symbol timing differences are used to determine the configurations for at least one type of reference signal transmissions in the neighbor cells.

4. The method of claim 3, wherein the symbol timing differences are reported by one or more UEs.

5. The method of claim 1, wherein a subset of configuration parameters for neighbor cells synchronous with the serving cell are different than those provided for neighbor cells asynchronous with the serving cell.

6. The method of claim 5, wherein:
   the subset of parameters comprises at least one of a slot offset or periodicity;
   a same slot offset or periodicity is provided for neighbor cells synchronous with the serving cell; and
   different slot offsets or periodicities are provided for neighbor cells asynchronous with the serving cell.

7. The method of claim 1, wherein the configurations are determined such that reference signals (RS) from neighbor cells arrive in a same slot or mini-slot within the measurement window.

8. The method of claim 1, wherein the configurations are determined such that reference signals (RS) from neighbor cells arrive in adjacent slots or mini-slots within the measurement window.

9. A method for wireless communications by a user equipment (UE), comprising:
   receiving an indication that one or more neighbor cells are synchronous or asynchronous with a serving cell of the UE;
   based on the indication, performing at least one type of reference signal measurement in cells that are synchronous with the serving cell differently than in cells that are asynchronous with the serving cell, wherein the at least one type of reference signal measurement comprises at least one of synchronization signal (SS) measurement or channel state information reference signal (CSI-RS) measurement; and
   obtaining configurations for transmissions of the at least one of SS or CSI-RS, wherein the configurations for transmissions of the at least one of SS or CSI-RS obtained for neighbor cells synchronous with the serving cell are different than the configurations for transmissions of the at least one of SS or CSI-RS obtained for neighbor cells asynchronous with the serving cell.

10. The method of claim 9, further comprising receiving an indication of which neighbor cells are synchronous or asynchronous with the serving cell.

11. The method of claim 9, wherein:
    the UE is configured to perform CSI-RS measurements in cells synchronous with the serving cell without detecting SS; and
    the UE is configured to detect SS in cells asynchronous with the serving cell before performing CSI-RS measurements in those cells.

12. The method of claim 9, wherein:
    the UE is configured to detect neighbor cells based on CSI-RS in cells synchronous with serving cell; and
    the UE is configured to detect neighbor cells based on SS in cells asynchronous with the serving cell.

13. The method of claim 12, wherein the UE is further configured to decode a physical broadcast channel (PBCH) in cells asynchronous with the serving cell before performing CSI-RS measurements in those cells.

14. The method of claim 9, further comprising:
    obtaining CSI-RS configuration information for a plurality of neighbor cells; and
    waking up to measure CSI-RS in the neighbor cells within a measurement window determined based on the configuration information.

15. The method of claim 9, wherein the UE is configured to determine whether to receive the CSI-RS with directional or omni-directional antenna configuration, based on the configuration information.

16. An apparatus for wireless communications by a network entity, comprising:
    means for determining, whether one or more neighbor cells are synchronous or asynchronous with a serving cell;
    means for providing an indication, to one or more user equipments (UEs), if one or more of the neighbor cells are synchronous or asynchronous with the serving cell;
    means for determining configurations for transmissions at least one type of reference signal in the neighbor cells, such that the reference signals from the neighbor cells are transmitted within a measurement window, wherein the at least one type of reference signal comprises at least one of synchronization signal (SS) or channel state information reference signal (CSI-RS); and
    means for providing an indication of the configurations to one or more UEs, wherein the configurations for transmissions of the at least one SS or CSI-RS provided for neighbor cells synchronous with the serving cell are different than the configurations for transmissions of the at least one of SS or CSI-RS provided for neighbor cells asynchronous with the serving cell.

17. The apparatus of claim 16, further comprising means for providing an indication, to one or more UEs, of which neighbor cells are synchronous or asynchronous with the serving cell.

18. The apparatus of claim 16, wherein:
the determination of whether the one or more neighbor cells are synchronous or asynchronous with the serving cell is based on reported symbol timing differences between a serving cell and one or more neighbor cells; and
the symbol timing differences are used to determine the configurations for at least one type of reference signal transmissions in the neighbor cells.

19. The apparatus of claim 16, wherein the symbol timing differences are reported by one or more UEs.

20. The apparatus of claim 16, wherein a subset of configuration parameters for neighbor cells synchronous with the serving cell are different than those provided for neighbor cells asynchronous with the serving cell.

21. The apparatus of claim 20, wherein:
the subset of parameters comprises at least one of a slot offset or periodicity;
a same slot offset or periodicity is provided for neighbor cells synchronous with the serving cell; and
different slot offsets or periodicities are provided for neighbor cells asynchronous with the serving cell.

22. The apparatus of claim 16, wherein the configurations are determined such that reference signals (RS) from neighbor cells arrive in a same slot or mini-slot within the measurement window.

23. The apparatus of claim 16, wherein the configurations are determined such that reference signals (RS) from neighbor cells arrive in adjacent slots or mini-slots within the measurement window.

24. An apparatus for wireless communications by a user equipment (UE), comprising:
means for receiving an indication if one or more neighbor cells are synchronous or asynchronous with a serving cell of the UE;
means for performing, based on the indication, at least one type of reference signal measurement in cells that are synchronous with the serving cell differently than in cells that are asynchronous with the serving cell, wherein the at least one type of reference signal comprises at least one of synchronization signal (SS) or channel state information reference signal (CSI-RS); and
means for obtaining configurations for transmissions of the at least one of SS or CSI-RS, wherein the configurations for transmissions of the at least one of SS or CSI-RS obtained for neighbor cells synchronous with the serving cell are different than the configurations for transmissions of the at least one of SS or CSI-RS obtained for neighbor cells asynchronous with the serving cell.

25. The apparatus of claim 24, further comprising receiving an indication of which neighbor cells are synchronous or asynchronous with the serving cell.

26. The apparatus of claim 24, further comprising:
means for performing CSI-RS measurements in cells synchronous with the serving cell without detecting SS; and
the UE is configured to detect SS in cells asynchronous with the serving cell before performing CSI-RS measurements in those cells.

27. The apparatus of claim 24, further comprising:
means for detecting neighbor cells based on CSI-RS in cells synchronous with serving cell; and
means for detecting neighbor cells based on SS in cells asynchronous with the serving cell.

28. The apparatus of claim 24, wherein the UE is further configured to decode a physical broadcast channel (PBCH) in cells asynchronous with the serving cell before performing CSI-RS measurements in those cells.

29. The apparatus of claim 24, further comprising:
means for obtaining CSI-RS configuration information for a plurality of neighbor cells; and
means for waking up to measure CSI-RS in the neighbor cells within a measurement window determined based on the configuration information.

30. The apparatus of claim 24, wherein the UE is configured to determine whether to receive the CSI-RS with directional or omni-directional antenna configuration, based on the configuration information.

31. A non-transitory computer readable medium having instructions stored thereon for:
determining whether one or more neighbor cells are synchronous or asynchronous with a serving cell;
providing an indication, to one or more user equipments (UEs), if one or more of the neighbor cells are synchronous or asynchronous with the serving cell;
determining configurations for transmissions of at least one type of reference signal in the neighbor cells, such that the reference signals from the neighbor cells are transmitted within a measurement window, wherein the at least one type of reference signal comprises at least one of synchronization signals (SS) or channel state information reference signal (CSI-RS); and
providing an indication of the configurations to one or more UEs, wherein the configurations for transmissions of the at least one of SS or CSI-RS provided for neighbor cells synchronous with the serving cell are different than the configurations for transmissions of the at least one of SS or CSI-RS provided for neighbor cells asynchronous with the serving cell.

32. A non-transitory computer readable medium having instructions stored thereon for:
receiving an indication if neighbor cells are synchronous or asynchronous with a serving cell of a user equipment (UE);
based on the indication, performing at least one type of reference signal measurement in cells that are synchronous with the serving cell differently than in cells that are asynchronous with the serving cell, wherein the at least one type of reference signal comprises at least one of synchronization signal (SS) or channel state information reference signal (CSI-RS); and
obtaining configurations for transmissions of the at least one of SS or CSI-RS wherein the configurations for transmissions of the at least one of SS or CSI-RS obtained for neighbor cells synchronous with the serving cell are different than the configurations for transmissions of the at least one of SS or CSI-RS obtained for neighbor cells asynchronous with the serving cell.

33. An apparatus for wireless communications by a network entity, comprising:
at least one processor configured to,
determine whether one or more neighbor cells are synchronous or asynchronous with a serving cell;
provide an indication, to one or more user equipments (UEs), if neighbor cells are synchronous or asynchronous with the serving cell;

determine configurations for transmissions of at least one type of reference signal transmissions in the neighbor cells, such that the reference signals from the neighbor cells are transmitted within a measurement window, wherein the at least one type of reference signal comprises at least one of synchronization signals (SS) or channel state information reference signal (CSI-RS); and provide an indication of the configurations to one or more UEs, wherein the configurations for transmissions of the at least one of SS or CSI-RS provided for neighbor cells synchronous with the serving cell are different than the configurations for transmissions of the at least one of SS or CSI-RS provided for neighbor cells asynchronous with the serving cell; and a memory coupled with the at least one processor.

34. An apparatus for wireless communications by a user equipment (UE), comprising:

a receiver configured to receive an indication if neighbor cells are synchronous or asynchronous with a serving cell of the UE; and at least one processor configured to:
perform, based on the indication, performing at least one type of reference signal measurement in cells that are synchronous with the serving cell differently than in cells that are asynchronous with the serving cell, wherein the at least one type of reference signal comprises at least one of synchronization signals (SS) or channel state information reference signal (CSI-RS); and obtain configurations for transmissions of the at least one of SS or CSI-RS, wherein the configurations for transmissions of the at least one of SS or CSI-RS obtained for neighbor cells synchronous with the serving cell are different than the configurations for transmissions of the at least one of SS or CSI-RS obtained for neighbor cells asynchronous with the serving cell.

* * * * *